Feb. 13, 1951     K. L. SCOTT     2,541,618
METHOD OF AND APPARATUS FOR MAKING
MAGNETIC MEASUREMENTS
Filed Jan. 22, 1947
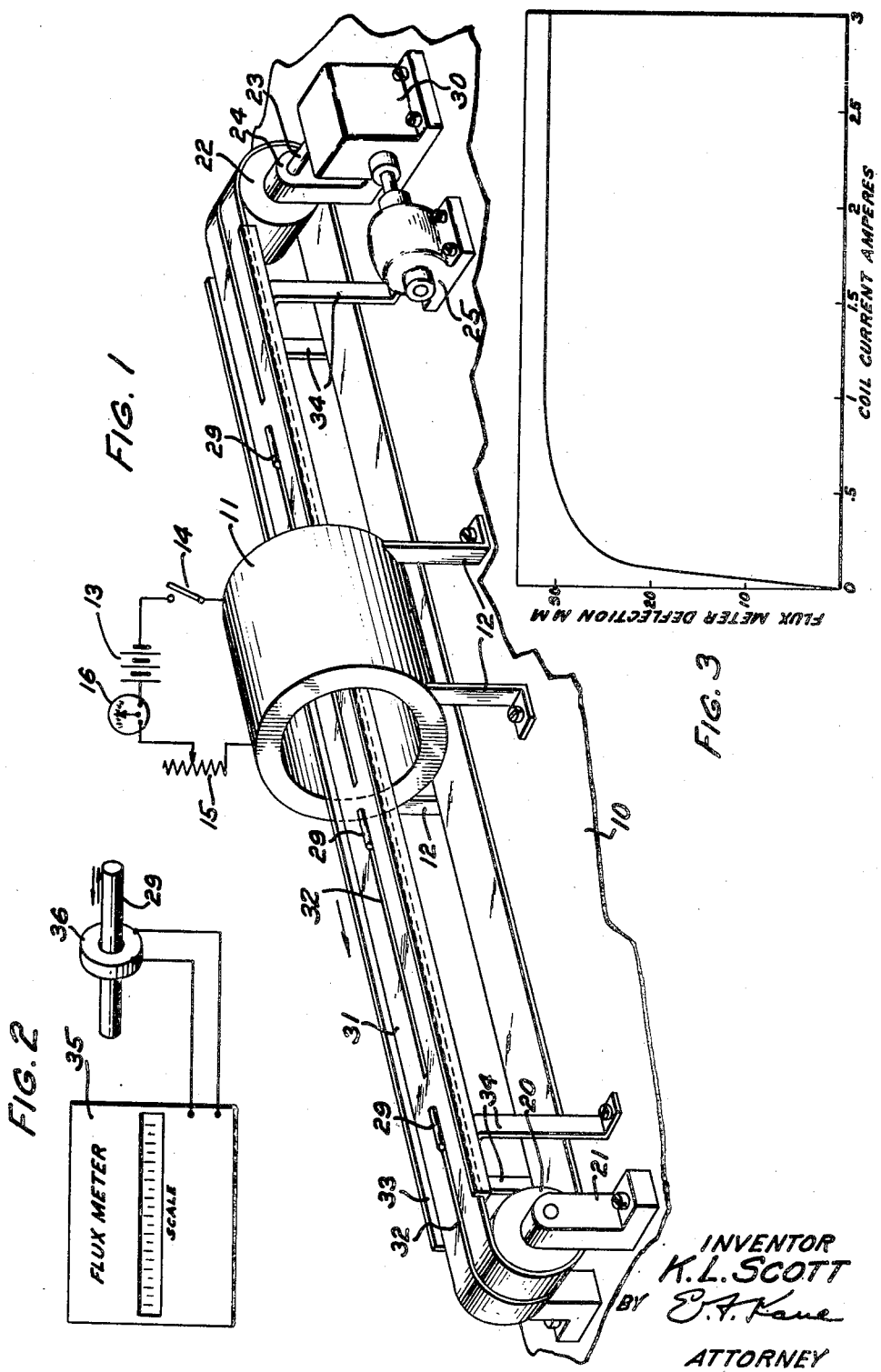
INVENTOR
K. L. SCOTT
BY E. A. Kane
ATTORNEY Patented Feb. 13, 1951

2,541,618

UNITED STATES PATENT OFFICE 2,541,618

METHOD OF AND APPARATUS FOR MAKING MAGNETIC MEASUREMENTS

Kenneth L. Scott, Western Springs, Ill., assignor to Western Electric Company, Incorporated, New York, N. Y., a corporation of New York Application January 22, 1947, Serial No. 723,520

12 Claims. (Cl. 175—183)

1

This invention relates to methods of and apparatus for making magnetic measurements and more particularly to methods and apparatus for measuring the remanence and coercive force of magnetic materials.

In certain types of electromagnetic relays it is necessary to employ ferro-magnetic core materials having the lowest possible coercive force to prevent "sticking" of the relay contacts after the circuit to the coil of the relay is broken. In the manufacture of such relays the selection of suitable relay cores was sought by employing values of remanence as an indication of the coercive force and rejecting cores having a remanence value beyond certain predetermined limits. Generally, remanence is determined by subjecting the magnetic core to a predetermined magnetizing force for a definite length of time, then removing the core from the field of the magnetizing force and measuring the remanence with a flux meter and search coil. The removal of the core from the field of the magnetizing force was done without regard to the time taken for the removal. It has been found that in most cases a recheck of the remanence measurements on previously tested cores, using the same measuring instruments, did not yield the same values obtained in original tests. Obviously, as a result of this method of selection, many cores having too high a coercive force would be accepted as having low coercive force because of a false low remanence indication.

Objects of this invention are to provide a new and efficient method of and apparatus for making accurate magnetic measurements.

In accordance with one embodiment of this invention, magnetic cores are placed on a slowly moving continuous belt passing through a magnetizing coil at a constant predetermined rate of speed to obtain the maximum remanence. After the magnetic core has passed through the magnetizing coil and is out of the range of the influence of the magnetizing coil, it is removed from the belt and the remanence is measured by any conventional means, for example, a search coil connected to a flux meter thereby giving a relative indication of the coercive force.

The invention will be completely understood from the following detailed description taken in conjunction with the accompanying drawing, in which

2

Fig. 1 is a perspective view of an apparatus embodying the features of the invention;

Fig. 2 shows a core being tested with a search coil connected to a fluxmeter; and Fig. 3 is a remanence-magnetizing force curve used to determine the area of substantial saturation.

Referring to the drawings, it will be seen that the apparatus includes a base 10 upon which is mounted a hollow magnetizing coil 11 supported on standards 12 secured to the base 10. The standards and other parts to be described and which are in proximity to the coil and core being treated are made of suitable non-magnetic material. The coil 11 may be energized by a source of electric current, for example, a battery 13 which is electrically connected to the coil through an electrical switch 14 and a variable rheostat 15 to control the current applied to the coil. To indicate the amount of current flowing through the coil 11, a current meter 16 is electrically connected in series with the battery 13 and the coil 11. An idler drum 20 is rotatably mounted in a vertical standard 21 secured to one end of the base 10. A similar drum 22 is fixed to a shaft 23 which is rotatably supported by a vertical standard 24 mounted at the opposite end of the base 10. The drum 22 may be rotated at a predetermined relatively slow angular velocity by a motor 25 connected to the shaft 23 through a reduction gear box 30 mounted on the base 10. A continuous conveyor belt 31 for conveying magnetic cores 29 through the hollow core of the coil 11 is carried by the drums 20 and 22, the upper loop of the belt passing through the hollow portion of the coil 11. The belt which is moved at a predetermined rate of speed by the drum 22 has an interrupted groove 32 formed in its center to accurately position magnetic cores in the center of the belt and carry them along with the belt. The belt is guided through the center of the coil 11 by a trough-like guide 33 which passes through the hollow portion of the coil and is supported at either end by legs 34 which are secured to the base 10. Care should be exercised to so orient the apparatus with respect to the earth's magnetic field to minimize the effect of the earth's field on the results of the magnetic measurements.

After the switch 14 has been closed and the current applied to the coil 11 has been raised to the desired value by adjusting the rheostat 15 a magnetic core 29 to be tested is placed by the operator on the moving belt 31 on that side of the coil at which the belt enters the hollow core of the coil. For most accurate results the magnetizing force should be sufficient to substantially saturate the core 29 with magnetic induction. The core 29 should be placed on the belt 31 a sufficient distance from the coil 11 to be unaffected by the magnetic field when first placed on the belt. The core 29 passes through the hollow portion of the coil 11 at a predetermined relatively low speed and is subjected to the magnetic field of the coil. As the core 29 emerges from the hollow portion of the coil 11, the belt 31 moves the core out of the range of the magnetic field at a sufficiently low rate of speed to ease those domains, which are constrained as a result of the applied magnetizing force, back into equilibrium with a minimum of disturbance thereby obtaining substantially maximum remanence in the core. When the core 29 has been conveyed out of the influence of the magnetizing field, it is removed from the belt 31 and the remanence thereof may be measured with a flux meter 35 having a low restorative torque connected to a search coil 36. The measurement is made in a conventional manner by inserting the core specimen 29 into the search coil 36, then removing it therefrom and observing the indication of the flux meter 35.

The term "substantial saturation" as used in this specification is that degree beyond which magnetism induced in a specimen will not be appreciably increased by an increase in magnetizing force. The value of magnetizing force at which substantial saturation is attained in a short straight core or a specimen having a large air gap may be determined by making successive tests with various values of magnetizing force and plotting magnetizing force against remanence. Since magnetizing force in a coil of given dimensions is proportional to the current and since the deflection on an arbitrary scale of a flux meter is proportional to the flux, it is simpler and the same results may be had by plotting flux meter deflection against magnetizing current, as shown in Fig. 3. The value of magnetizing current at which the upper end of this curve begins to flatten out or approach a slope of zero is also the value of magnetizing current at which substantial saturation is attained. Of course, cores of different sizes and of different materials require different degrees of magnetizing force in order to be substantially saturated.

A relay core $3^{17}/_{32}$" long and $^{5}/_{16}$" in diameter made of annealed unaged iron having a maximum carbon content of .04%, was substantially saturated with a magnetizing current of about one ampere passing through 3500 turns of #17 wire formed into a coil 9" long with an external diameter of 5" and an internal diameter of 2". This value of magnetizing current was arrived at by successively subjecting the specimen to varying degrees of magnetizing force by changing the coil current and measuring the magnetic induction of each specimen at each level of coil current as illustrated by the curve in Fig. 3.

The value of remanence is, of course, a relative indication of the coercive force of the core. It was discovered that the apparent remanence of magnetically "soft" materials varies according to the speed with which the magnetic material is withdrawn from the field of the magnetizing force and that an accurate indication of coercive force could be had only by obtaining the maximum remanence possible. This was done by withdrawing the magnetic material from the field of the magnetizing force at a relatively slow rate of speed below a predetermined maximum rate. It was further found that when using this method, repeated tests of the same cores yielded practically the same remanence values with variations only within the range of the percentage of error in the measuring instruments used. As pointed out hereinbefore, it was discovered that the values of residual flux in magnetic materials with an air gap in the circuit are dependent upon the rate of decrease of the magnetizing force from $H_{max}$ to $H_{zero}$. This result has not been observed or recorded before as far as is known. However, it appears to be consistent with the domain theory of the mechanism of magnetization, as it seems reasonable to expect that a gradual decrease of magnetizing force would ease those domains, which are constrained as a result of the applied magnetizing force, back into equilibrium with a minimum of disturbance, whereas, an abrupt release of the constraining force would result in reversing some domains which, on slow release, are not disturbed.

Instead of mechanically removing the magnetic core 29 from the magnetizing force as hereinbefore described, the magnetic core may be placed within the hollow core of the magnetizing coil 11 and subjected to a magnetizing force raised from $H_{zero}$ to $H_{max}$ which is then gradually reduced from maximum to zero by means of the variable rheostat 15, thereby realizing the same result as obtained by the gradual mechanical withdrawal of the core 29 from the magnetic field. Preferably the rheostat 15 is one which, rather than reducing or increasing the resistance step by step, effects a continuous variation.

The speed with which any particular magnetic material should be removed from the magnetizing force or vice versa may be determined empirically by making a number of tests, gradually reducing the speed of removal or the reduction of the magnetizing force until the maximum remanence is approached as indicated when a further reduction in speed of removal or of magnetizing force does not result in any appreciable increase in remanence.

For example, successive tests at various speeds of removal from the magnetizing field as indicated in the table below were made with a core $3^{17}/_{32}$" long and $^{5}/_{16}$" in diameter made of annealed unaged iron having a carbon content of .04% or less.

*Annealed unaged iron specimen (carbon content .04% or less)*

| Time (in seconds) | Fluxmeter deflection (proportional to flux in core) |
|---|---|
| 0 (circuit opened as fast as possible) | 19.0 |
| .096 | 32.5 |
| .191 | 38.5 |
| .286 | 43.5 |
| .381 | 45.5 |
| .476 | 47.5 |
| .955 | 53.0 |
| 1. to infinity | 62.2 |

From these tests, it is apparent that below a certain speed, in this case 18" per second, the remanence will remain the same and will be the maximum indicating true characteristics of the core material. Further tests were made with an annealed aged core of the same material and size from which the following data was tabulated.

*Annealed aged iron specimen (carbon content .04% or less)*

| Time (in seconds) | Fluxmeter deflection (proportional to flux in core) |
|---|---|
| 0 (circuit opened as fast as possible) | 30.0 |
| .096 | 40.5 |
| .191 | 57.2 |
| .286 | 67.0 |
| .381 | 74.0 |
| .476 | 79.0 |
| .955 | 83.5 |
| 1. to infinity | 93.5 |

It will be seen that these tests are corroborative of the tests with the unaged iron thus substantiating the discovery that the remanence measurement is affected by the speed of removal of the magnetic material from the field of magnetizing force and that true remanence can only be measured below a predetermined speed of removal.

All of the above tests were made with 3500 turns of #17 insulated copper wire formed into a magnetizing coil having the following dimensions: 9" long; 2" inside diameter; and 5" outside diameter. A two-ampere coil current was used during the tests. The time indicated in the tables is the recorded time elapsed while the specimen core was moved from the center of the coil to a point 18" away along the axis of the coil.

What is claimed is:

1. A method of determining the coercive force of magnetic materials comprising subjecting a specimen of magnetic material to a magnetizing force sufficient to saturate the material, removing said specimen from the influence of said magnetizing force at a predetermined slow rate of speed, and measuring the remanence of said specimen.

2. A method of determining the coercive force of magnetic materials comprising subjecting a specimen of magnetic material to the influence of a magnetizing force sufficient to saturate the material, removing said specimen from the influence of said magnetizing force, the rate of said removal being such that said specimen will retain substantially the greatest value of remanence consistent with its composition, and measuring said value of remanence.

3. A method of determining the coercive force of magnetic materials comprising subjecting a specimen of magnetic material to a magnetizing force sufficient to saturate the material, gradually reducing said magnetizing force from $H_{max}$ to $H_{zero}$, said reduction being at a rate that will leave the maximum remanence obtainable with the composition of said specimen, and measuring the value of said remanence.

4. A method for determining the coercive force of magnetic material including the steps of subjecting said material to a magnetizing force sufficient to saturate the material and removing said magnetizing force at a predetermined rate, measuring the value of remanence thereby obtained in said magnetic material and successively repeating the whole of the aforesaid procedure, each repetition being at a progressively slower rate until maximum remanence has been obtained in said magnetic material.

5. A method for determining the coercive force of magnetic material including the steps for determining the rate of mechanical withdrawal of said magnetic material from a magnetizing force to obtain maximum remanence comprising subjecting said material to a magnetizing force sufficient to saturate the material and removing said magnetizing force at a predetermined rate, measuring the value of remanence thereby obtained in said magnetic material, and successively repeating the whole of the aforesaid procedure, each repetition being at a progressively slower rate until maximum remanence has been obtained in said magnetic material.

6. A method of determining the coercive force of magnetic materials comprising electrically energizing a coil to produce a magnetic field sufficient to saturate said magnetic materials, placing specimens of magnetic material under the influence of said magnetic field, reducing the electrical energization of said coil to reduce the strength of said field from $H_{max}$ to $H_{zero}$, the rate of said reduction being such that said specimen will retain the maximum value of remanence, and measuring the said value of remanence.

7. In a method of determining the coercive force of magnetic materials, the steps for selecting the proper rate of reduction of a magnetizing force from $H_{max}$ to $H_{zero}$ to obtain maximum remanence in magnetic materials subjected to said magnetizing force, comprising subjecting a specimen of magnetic material to a magnetizing force of sufficient strength to substantially saturate said material, reducing the magnetizing force from $H_{max}$ to $H_{zero}$ at a predetermined slow rate of reduction, measuring the remanence of said specimen, and successively repeating the whole of the aforesaid procedure, the rate of reduction in each repetition being progressively slower until the maximum remanence is obtained.

8. A method for determining the coercive force of magnetic material including the steps of subjecting said material to a magnetizing force of sufficient strength to substantially saturate said material and removing said magnetizing force at a predetermined rate, measuring the value of remanence thereby obtained in said magnetic material and successively repeating the whole of the aforesaid procedure, each repetition being at a progressively slower rate until maximum remanence has been obtained in said magnetic material, and then testing articles of magnetic material by passing them through said area at the rate of speed selected as obtaining the maximum remanence.

9. A method of determining the coercive force of magnetic material comprising subjecting a specimen of magnetic material to a magnetizing force to substantially saturate said specimen, removing said specimen from the influence of said magnetizing force at a rate of speed necessary to obtain maximum remanence, which speed is comparable to removing an annealed unaged specimen of iron with a carbon content of .04 per cent or less $3\frac{1}{2}$ inches long and $\frac{1}{16}$ of an inch in diameter at not more than 18 inches per second from the center of a coil of 3500 turns of No. 17 copper wire and having an inside diameter of 2 inches, an outside diameter of 5 inches and a length of 9 inches with 2 amperes flowing through said coil, and determining the remahence of said specimen as a measure of the coercive force.

10. A method of determining the coercive force of magnetic material comprising subjecting a specimen of magnetic material to a magnetizing force to substantially saturate said specimen, removing said specimen from the influence of said magnetizing force at a rate of speed necessary to obtain maximum remanence, which speed is comparable to removing an annealed aged specimen of iron $3\frac{1}{2}$ inches long and $\frac{1}{16}$ of an inch in diameter at not more than 18 inches per second from the center of a coil of 3500 turns of No. 17 copper wire and having an inside diameter of 2 inches, an outside diameter of 5 inches and a length of 9 inches with 2 amperes flowing through said coil, and determining the remanence of said specimen as a measure of the coercive force.

11. A method of determining the coercive force of an annealed unaged specimen of magnetic iron $3\frac{17}{32}$ inches long and $\frac{3}{16}$ of an inch in diameter which comprises subjecting said specimen to the influence of the magnetizing force existing at the center of a coil of 3500 turns of No. 17 copper wire having an inside diameter of 2 inches, an outside diameter of 5 inches and a length of 9 inches with 2 amperes flowing through said coil, removing said specimen from said magnetic force at a speed of not more than 18 inches per second, and determining the remanence of said specimen as a measure of its coercive force.

12. A method of determining the coercive force of an annealed aged specimen of magnetic iron $3\frac{17}{32}$ inches long and $\frac{3}{16}$ of an inch in diameter which comprises subjecting said specimen to the influence of the magnetizing force existing at the center of a coil of 3500 turns of No. 17 copper wire having an inside diameter of 2 inches, an outside diameter of 5 inches and a length of 9 inches with 2 amperes flowing through said coil, removing said specimen from said magnetic force at a speed of not more than 18 inches per second, and determining the remanence of said specimen as a measure of its coercive force.

KENNETH L. SCOTT.

REFERENCES CITED

The following references are of record in the file of this patent:

UNITED STATES PATENTS

| Number | Name | Date |
|---|---|---|
| Re. 21,927 | Brace et al. | Oct. 21, 1941 |
| 1,187,054 | Everest | June 13, 1916 |
| 1,293,912 | Porter | Feb. 11, 1919 |
| 1,460,759 | Kuhn-Frei | July 3, 1923 |
| 1,663,539 | Bellinger | Mar. 27, 1928 |
| 2,054,672 | Edgar | Sept. 15, 1936 |
| 2,427,774 | Fredrickson | Sept. 23, 1947 |
| 2,455,874 | Newman | Dec. 7, 1948 |